United States Patent [19]

Arthurs et al.

[11] 4,233,572
[45] Nov. 11, 1980

[54] DYE LASER TUNER

[75] Inventors: Eugene G. Arthurs, Killearn, By Glasgow; Anthony F. Purdie, Glasgow, both of Scotland

[73] Assignee: Barr & Stroud Limited, Glasgow, Scotland

[21] Appl. No.: 962,570

[22] Filed: Nov. 16, 1978

[30] Foreign Application Priority Data

Apr. 1, 1978 [GB] United Kingdom ............... 12840/78

[51] Int. Cl.³ .......................... H01S 3/081; H01S 3/10
[52] U.S. Cl. .......................... 331/94.5 M; 331/94.5 C; 350/152; 350/157; 332/7.51
[58] Field of Search ................. 332/7.51; 331/94.5 C, 331/94.5 D, 94.5 M; 350/157, 158

[56] References Cited

U.S. PATENT DOCUMENTS

| 3,488,105 | 1/1970 | Snaper | 350/158 |
| 3,775,699 | 11/1973 | Cassels | 331/94.5 C |
| 3,934,210 | 1/1976 | Yarborough et al. | 350/157 |
| 3,969,684 | 7/1976 | Witte et al. | 331/94.5 M |
| 3,983,507 | 9/1976 | Tang et al. | 331/94.5 C |

*Primary Examiner*—Nelson Moskowitz
*Attorney, Agent, or Firm*—Mason, Fenwick & Lawrence

[57] ABSTRACT

A laser of the kind in which the lasing medium is a free flowing dye stream incorporates a means of tuning the output wave length of the laser, this means being in the form of a wedged birefringent plate which is driven in a linear mode by a linear translator so that the thickness of the birefringent plate traversed by the intracavity beam of laser light may be varied.

7 Claims, 3 Drawing Figures

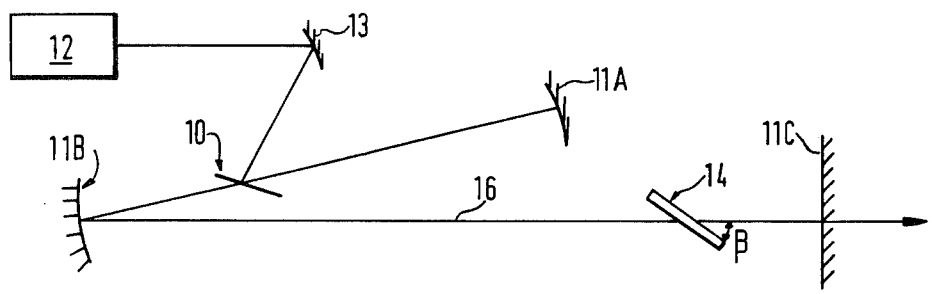
*Fig.1*
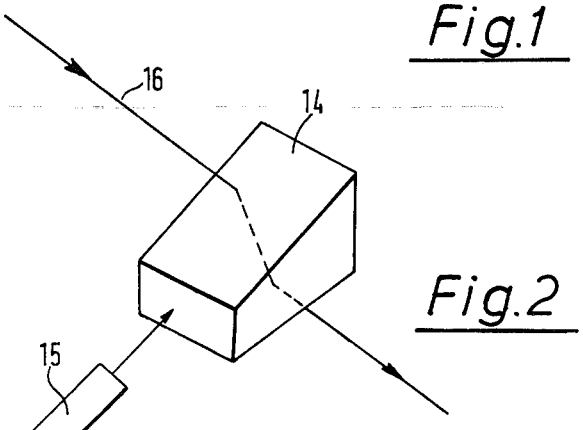
*Fig.2*
*Fig.3*

DYE LASER TUNER

This invention relates to lasers.

Various forms of lasers exist some of which, for example dye lasers, lase over a relatively wide band (e.g. about 40 nm) of wavelengths. The present invention is particularly concerned with a device for tuning the output wavelength of such a laser.

According to the present invention there is provided a laser of the kind which lases with polarised light over a relatively wide band of wavelengths including a means of tuning the output wavelength of the laser, said means comprising a wedged birefringent plate located to intercept the beam of intracavity light, and a linear translator drivingly connected to the wedged birefringent plate, whereby the thickness of said birefringent plate traversed by the intracavity beam of light may be varied.

Preferably said birefringent plate is arranged at Brewster's angle to the intracavity beam of light to achieve polarisation of the intracavity beam.

Alternatively, polarising elements may be contained in the laser cavity. As a further alternative the polarisation of the intracavity beam may be achieved by using a polarised light pump for the laser.

Conveniently the laser is a dye laser of the kind described by Runge et al in IEEE Journal of Quantum Electronics, December 1972 entitled "Unconfined Flowing Dye Films for CW Dye Lasers."

An embodiment of the present invention will now be described by way of example with reference to the accompanying drawings, in which:

FIG. 1 schematically illustrates a laser according to the present invention;

FIG. 2 illustrates the wedged birefringent tuning plate used in the laser of FIG. 1; and FIG. 3 is a vector diagram useful in understanding the operation of the present invention.

In FIG. 1 the dye sheet is shown at 10 being located in a laser cavity formed by reflectors 11A, 11B, 11C. The sheet 10 which is produced by the unconfined flow of a dye in the manner described in the Runge et al article is at the centre of curvature of reflector 11A and at a distance equal to half the radius of curvature of reflector 11B from reflector 11B so that the beam of lasing light between reflectors 11B, 11C is collimated. The dye laser is pumped by an argon ion CW pump laser 12 the output beam of which is focussed onto the dye sheet 10 by a focussing mirror 13. The wedged birefringent plate tuner to be described is shown at 14. The most practical material for the plate 14 is quartz and the wedge angle can be very small, for example about 1 degree, and for convenience the plate 14 is disposed at Brewsters' angle $\beta$. The dye sheet 10 is arranged at Brewsters' angle to the lasing beam between reflectors 11A and 11B.

The operation of the device may be explained with reference to the vector diagram (FIG. 3) which refers to a light ray travelling inside the quartz plate 14. There O is the entry point of a ray OS; ON is the normal to the surface of the plate 14 and OZ is the optic axis of the plate. In this case the light ray polarisation is in the plane containing ON and OS; $\alpha$ is the complement of Brewster's angle (approximately 33° for quartz).

There are two conditions to be fulfilled which define the orientation of the optic axis OZ in the plate. Firstly, since the plate operates as a variable retardation device, we must ensure that equal components of polarisation lie in the extraordinary (slow) and ordinary (fast) planes i.e. in planes containing (a) ON and OS and (b) OS and OZ, respectively. This is done by ensuring that angle $\phi$ is equal to an odd multiple of 45°, where $\phi$ is the angle between the projections of the vectors ON and OZ on the plane normal to OS.

Secondly, the difference of relative retardation for different wavelengths must be such that the "free spectral range" (FSR) i.e. the frequency separation of adjacent passbands is greater than the lasing range of a typical dye. Then, only one wavelength will lase over the whole of the tuner's range.

The relative phase retardation of the two polarisation components is given by $$\delta' = \frac{2\pi \cdot T(n_3 - n_o)\mathrm{Sin}^2\gamma}{\lambda \mathrm{Cos}\alpha}$$

where $\lambda$ is the wavelength, T is the plate thickness and $n_e$ and $n_o$ are the extraordinary and ordinary refractive indices of the birefringent material.

If the relative phase retardation is at or very close to a full wave ($\delta'=2n\pi$, n integer) then the vertically polarised incident light will be very close to vertical polarisation on exit from the plate and will suffer minimum reflection at the Brewster face.

At any other retardation the exiting light will not be vertically polarised and there will be sufficient reflection losses in the plate 14 to prevent the system lasing.

T is chosen to be a convenient average size, say 2 mm. For a given central wavelength $\lambda$ we then calculate a value of $\gamma$ such that the next lasing wavelength ($\delta'=2(n\pm1)\pi$) is sufficiently far away (say 100 nm). This then defines $\delta$ such that $\phi$ is an odd multiple of 45°.

To alter the lasing wavelength we can either change $\gamma$ or alter T. The former method, usually accomplished by rotating the plate about the surface normal (ON) to preserve Brewster's angle, has the disadvantage of changing the $\phi=45°$ condition so that the device then becomes less efficient at wavelengths away from the central one. The present invention relies upon altering T by moving to a different part of the wedge allowing the $\phi=45°$ condition to be maintained over the entire tuning range. It is found that for a quartz wedge angle of approximately 1° a 100 nm tuning range at a central wavelength of 600 nm is produced over a plate length of about 35 mm.

The birefringent plate may be mounted on an ordinary compact, linear translator held at Brewster's angle since this angle minimises surface reflection and maximises polarisation of the intracavity beam. In experimental operation the device has produced linewidths considerably narrower than known wedged Fabry-Perots without the same coating damage problems; these linewidths are similar to those achieved by conventional rotating birefringent plate tuners but these tuners require a very thin plate which gives rise to unwanted etalon effects. Also, the motion is linear which is easier to design to the degree of accuracy which is involved. FIG. 2 is a schematic illustration of the wedged plate 14 drivingly connected to a linear translator 15 and intercepting the intracavity light beam 16.

The slight deviation of the intracavity beam produced by the birefringent wedge 14 may be removed by cementing a wedge of non-birefringent material, e.g.

fused silica, to the quartz wedge so that the sandwich has parallel faces.

Further spectral narrowing of the intracavity beam linewidth is possible with rotating birefringent plates arranged in stacks of special sizes, as is well known. A similar effect is possible with a set of linearly movable wedged plates of different thickness with optic axes aligned, but an alternative is to keep the thickness constant and choose values of $\gamma$ which give the required free spectral range properties.

Although we have described a wedge angle of 1° for the birefringent plate 14 larger wedge angles may be used. For example angles of up to 10° may be acceptable and even larger angles (e.g. 30°–40°) are possible if the plate 14 is used in combination with one or more prisms (of non-birefringent material).

What is claimed is:

1. A laser including a lasing medium which lases over a relatively wide band of wavelengths,
    means effecting strong linear polarisation in one plane of the intracavity light beam,
    and means of tuning the output wavelength of the laser, said tuning means comprising a wedged plate made of birefringent material located to intercept the beam of intracavity light, said plate having its incident surface oriented with respect to the incident light beam such that within the plate at the point of incidence the projection onto the plane normal to the light beam path of the normal from the incident plate surface is at an angle $\phi$, substantially equal to an odd multiple of 45°, to the projection of the optic axis of the plate onto said plane and, the nominal plate thickness and the angle $\gamma$ between the light beam path within the plate and the optic axis of the plate are such that the free spectral range of the plate is greater than the bandwidth of lasing wavelengths, and at one wavelength within the lasing bandwidth the components of incident-light along the fast and slow axes of the birefringent material have a relative retardation equal to an integral multiple of $2\pi$,
    and a linear translator drivingly connected to the tuning means so that the thickness of the plate traversed by the intracavity beam of light may be varied without alteration of the angles $\phi$ and $\gamma$ whereby to effect tuning of the output wavelength of the laser within the lasing bandwidth.

2. A laser as claimed in claim 1, wherein the wedged plate is made of birefringent quartz, has a wedge angle of the order of one degree and a nominal thickness of the order of two millimeters.

3. A laser as claimed in claim 1, wherein said polarisation means comprises the incident surface of the wedged plate supported and maintained by the linear translator at Brewster's angle to the intracavity light beam.

4. A laser as claimed in claim 1, wherein the lasing medium is an unconfined free-flowing sheet of dye optically coupled to a CW laser pump.

5. A laser as claimed in claim 4, wherein the plate is supported at Brewster's angle to the intracavity beam of light.

6. A laser as claimed in claim 5, wherein the polarisation means comprises the incident surface of the wedged plate supported and maintained by the linear translator at Brewster's angle to the intracavity light beam and means maintaining the dye sheet at Brewster's angle to the intracavity light beam between the first and second concave mirrors.

7. A laser as claimed in claim 1, wherein in addition to said wedged plate the tuning means comprises at least one other wedged plate made of birefringent material, the optic axes of the wedged plates being aligned.

* * * * *